United States Patent
Stephenson, III et al.

(10) Patent No.: US 7,009,190 B1
(45) Date of Patent: Mar. 7, 2006

(54) METHOD AND APPARATUS FOR CAPTURING AN IMAGE

(75) Inventors: Stanley W. Stephenson, III, Spencerport, NY (US); Xiang-Dong Mi, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/009,896

(22) Filed: Dec. 10, 2004

(51) Int. Cl.
*G01N 21/00* (2006.01)
*G03B 27/02* (2006.01)

(52) U.S. Cl. ............................... 250/481.1; 250/504 R; 118/31.5; 427/1

(58) Field of Classification Search ...................... None
See application file for complete search history.

(56) References Cited

U.S. PATENT DOCUMENTS

| | | | |
|---|---|---|---|
| 5,236,780 A * | 8/1993 | Yamane et al. | .......... 428/402.2 |
| 6,630,997 B1 | 10/2003 | Green et al. | |
| 6,740,255 B1 | 5/2004 | Kato et al. | |
| 6,759,264 B1 | 7/2004 | Chou et al. | |
| 2002/0150284 A1 | 10/2002 | Iwai | |
| 2002/0163601 A1 | 11/2002 | Min et al. | |
| 2004/0061808 A1 | 4/2004 | Stephenson et al. | |
| 2004/0125398 A1 | 7/2004 | Kuntz et al. | |

FOREIGN PATENT DOCUMENTS

| | | |
|---|---|---|
| JP | 11-258759 | 9/1999 |
| WO | WO 2004/036484 A1 | 4/2004 |

OTHER PUBLICATIONS

S. Yamamoto, et el., "A Novel Photoaddressable Electronic Paper Utilizing Cholesteric LC Microcapsules and Organic Photoconductor", pp. 362-365 SID 01 Digest.
Xiang-Dong Mi, et al., "A Bistable Watermark", filed as U.S. Appl. No. 11/009,884 on Dec. 10, 2004.
Xiang-Dong Mi, et al., "A Bistable Display", filed as U.S. Appl. No. 11/009,767 on Dec. 10, 2004.

* cited by examiner

*Primary Examiner*—Nikita Wells
(74) *Attorney, Agent, or Firm*—Kathleen Neuner Manne (57) ABSTRACT

A method of forming a contact image of an object on an imaging sheet including a bistable thermally responsive material is described, wherein the method comprises applying energy to the imaging sheet, the object, or both, and contacting the sheet with the object, thereby creating an image of the object on the sheet.

20 Claims, 7 Drawing Sheets

METHOD AND APPARATUS FOR CAPTURING AN IMAGE

CROSS-REFERENCE TO RELATED APPLICATIONS

Cross-reference is made to commonly assigned, co-filed applications by Xiang-Dong Mi and Stanley Stephenson, U.S. patent application Ser. Nos. and 07/470,459 and 08/974,278.

FIELD OF THE INVENTION

The present invention relates to a contact imaging sheet having a bistable, thermally responsive material, and a method of forming a contact image on the imaging sheet.

BACKGROUND OF THE INVENTION

Transfer images, wherein the image retained on a material is the mirror image of the original object, can be obtained in many ways. Traditionally, transfer images have been made by inking or otherwise coating the original object, and placing the object against a receptive material, such as paper, canvas, cardboard, cloth, or the like, wherein the receptive material becomes imprinted with the mirror image of the object.

For example, a fingerprint can be acquired by pressing a finger onto an inked surface, and pressing the inked finger against a receptive or imaging sheet. U.S. Pat. No. 6,298,805 discloses ink and an inking apparatus for taking fingerprints. In fingerprinting, or any image transfer, after inking, the object, for example, the finger, must be applied to the receptive sheet accurately to provide a good image. The application must be made smoothly, with even pressure, and without movement of the object relative the receptive sheet, or smearing will occur. Errors made in capturing the image require use of a new receptive sheet and re-inking of the object. After image capture, the object must be cleaned, which is often messy and time consuming. The entire image capture process requires multiple steps, is messy, and is prone to error.

Electronic means have been proposed for capturing fingerprints. U.S. Pat. No. 6,784,413 discloses optical means for capturing an image of a fingerprint. U.S. Pat. No. 7,592,264 discloses an electronic sensor responsive to pressure that can capture a fingerprint pattern digitally. An additional apparatus, such as a printer, is required to convert the digital data into a print of the fingerprint. Forming a print in this manner requires two separate apparatuses, as well as media for the printer.

Various electrically responsive materials are bistable, meaning that they are capable of retaining an image in the absence of power. Such materials are being used to provide field-stable, re-writable displays. The materials can be capable of changing optical states in response to applied energy in the form of electricity, magnetic field, heat, or light.

U.S. Pat. No. 3,789,225 discloses a method of forming an image on a display including glassy cholesteric liquid crystal material between glass plates. Glassy liquid crystal materials are solidified liquid crystals in an orderly state at ambient temperatures. They are not responsive to electrical fields in the glassy state. The method for forming the image includes writing the display to an initial state by heating the liquid crystal material above a transition point, cooling the material, and applying a high-intensity xenon flash lamp imagewise to the cooling material so that the flashed areas solidify into a state different than areas not receiving flash energy.

Non-glassy liquid crystals can be electrically driven between a planar state reflecting a specific visible wavelength of light, and a light scattering focal-conic state, at ambient temperatures. Chiral nematic liquid crystals, also known as cholesteric liquid crystals, are bistable. U.S. Pat. No. 5,437,811 discloses a light-modulating display including a polymer dispersed chiral nematic liquid crystal that is capable of changing optical states in the presence of an electric field, and maintaining a given optical state in the absence of the field.

U.S. Pat. No. 6,740,255 discloses a photo-responsive liquid crystal composition that is capable of recording an image-wise pattern in response to ultra-violet light. The image can be erased by heating.

The above methods of image capture using bistable materials require expensive and complex photosensitive layers for operation, complex electrical drive systems for writing data sequentially, or both. Contact printing systems known in the art can require more than one apparatus, such as an image-capture device and printer, to reduce the image to a printed form, and can be messy and time consuming.

There is a need for a simple and clean method of producing a transfer image. It is desirable that such an image be rewritable should an error occur in image capture. It is further desirable that the image capture apparatus and imaging material be simple to operate and portable.

SUMMARY OF THE INVENTION

A contact imaging method is described, wherein the method comprises obtaining an imaging sheet, the imaging sheet comprising a substrate and a bistable thermally responsive material layer on the substrate, obtaining an object to be imaged, applying energy to heat the imaging sheet, the object, or both, and contacting the object with the imaging sheet. A system for imaging an object is also described.

ADVANTAGES

The contact imaging method described herein provides a method of forming a contact image without the use of ink, a colorant, or permanently marking materials. The method comprises only two steps, applying an object to be imaged to an imaging sheet, and applying energy to the imaging sheet and/or the object. The method is quick, can be used with a variety of energy sources, and forms an image that can be erased, if desired, allowing reuse of the imaging sheet. The method can use an imaging device, but one is not required. Ordinary energy sources can be used, eliminating the need to transport heavy, delicate, or cumbersome imaging systems.

DETAILED DESCRIPTION OF THE INVENTION

An imaging sheet responsive to thermal energy can be used to create a rewritable image on contact with an object. The imaging sheet can be formed on or placed in a carrier. The carrier can allow for imaging of the imaging sheet.

The imaging sheet can include a bistable material responsive to thermal energy. A bistable material is a material capable of maintaining an image in the absence of applied power. Suitable thermally responsive bistable materials can include an electrochemical material or a liquid crystal material such as chiral nematic (cholesteric) liquid crystal. According to certain embodiments, the bistable material can be chiral nematic liquid crystals. The chiral nematic liquid crystals can be polymer dispersed liquid crystals (PDLC).

Suitable cholesteric liquid crystal materials can include highly anisotropic nematic liquid crystal mixtures including a chiral doping agent to provide helical twist in the planes of the liquid crystal such that interference patterns are created that reflect incident light. Application of electrical fields of various intensity and duration can be employed to drive a chiral-nematic (cholesteric) material into a reflective state, to near-transparent or transmissive state, or an intermediate state. These materials have the advantage of having first and second optical states that are both stable in the absence of an electrical field. The materials can maintain a given optical state indefinitely after the field is removed. Cholesteric liquid crystal materials can be formed, for example, using a two-component system such as MDA-00-1444 (undoped nematic) and MDA-00-4042 (nematic with high chiral dopant concentrations), both available from E.M. Industries of Hawthorne, N.Y.

The imaging sheet can include a substrate to support the thermally responsive material. The substrate can be any suitable material, for example, glass or plastic. When the substrate is plastic, it can be flexible, for example, a flexible self-supporting plastic film. "Plastic" means a polymer, usually made from polymeric synthetic resins, which can optionally be combined with other ingredients, such as curatives, fillers, reinforcing agents, colorants, and plasticizers. Plastic includes thermoplastic materials and thermosetting materials. The substrate can be transparent or opaque. According to various embodiments, the substrate can be transparent. Suitable materials for a flexible substrate can include, but are not limited to, polyethylene terephthalate, polyethylene naphthalate, polyimide, and polycarbonate. The substrate can provide dimensional stability. The substrate can have any suitable thickness required for handling of the material. For example, the substrate can be between 12 and 300 microns. Where a flexible plastic substrate is used, it can be reinforced with a hard coating, for example, an acrylic coating. The coating can have a thickness of from 1 to 30 microns, for example, from 2 to 4 microns. Various suitable hard coatings can be used, dependent upon the substrate material. Such coatings can include a mixture of UV-cured polyester acrylate and colloidal silica, known as "Lintec" by Lintec Corporation of Tokyo, Japan, and an acrylic coating sold as Terrapin® by Tekra Corporation, New Berlin, Wis.

To provide a means of converting various energy sources to thermal energy, the bistable material, another layer in the imaging sheet, or multiple layers, can include a thermo-converting material that is capable of converting energy to heat. When the thermo-converting material is in another layer, the layer can be between the substrate and the thermally responsive material, on a side of the thermally responsive material opposite the substrate, or both. According to various embodiments, at least one layer including a thermo-converting material is adjacent the thermally responsive material. The thermo-converting material-containing layer can be co-deposited on the imaging sheet with the thermally responsive material.

Examples of suitable thermo-converting materials can include an infrared absorbing material for converting infrared light energy to heat, an ultraviolet absorbing material for converting ultraviolet light to heat, a light absorbing material for absorbing and converting various wavelengths of light to heat, and a conductive material for converting electrical energy or a magnetic field to heat. Suitable infrared absorbing materials can include organic and inorganic particles or organic dyes. Suitable ultraviolet absorbing materials can include organic or inorganic particles or organic dyes. Suitable light absorbing materials can include, for example, carbon black, graphite, colloidal silver, light absorbing dyes such as cyanine dyes, polymethine dyes, naphthaquinone dyes, anthraquinone dyes, phthalocyanine dyes, or azo dyes. Conductive materials can include various metals such as copper, silver, gold, silicon, aluminum, nickel, chromium, or various alloys thereof. Other suitable materials will be apparent to practitioners in the art. The thermo-converting material can be chosen in accordance with the desired method of imaging the imaging sheet.

A colored layer can be included in the imaging sheet to improve contrast between states of the bistable thermally responsive material. The colored layer, typically called a dark layer, can be black or any other color depending on the color of the bistable material in its various states. The dark layer can include carbon black, a dye, a colorant, or other colored material. According to certain embodiments, the dark layer can include the thermo-converting material. The colorant of the dark layer can be the thermo-converting material, for example, carbon black. The dark layer can provide a sufficient contrast between the imaged and non-imaged areas of the bistable thermally responsive material for the image to be viewable. For example, the dark layer can have a density of 2.0 or greater for clarity of image, though lower densities may be suitable for viewability dependent on the bistable material and color of the dark layer as viewed in contrast to the imaged or non-imaged areas of the bistable material.

The imaging sheet can include a protective layer on the side opposite the substrate, on the substrate, or both. The protective layer can be a polymeric material. The protective layer can be transparent. The protective layer can include a thermo-converting material. The protective layer can allow desirable wavelengths of light to pass into the imaging sheet, for example, ultraviolet, infrared, or broad spectrum light. The protective layer can allow at least 70%, at least 80%, or at least 90% of any light to pass through.

According to various embodiments, one or more conductive layers can be included in the imaging sheet. A conductive layer can be between the substrate and bistable material layer, on the side of the bistable material opposite the substrate, or both. A conductive material can be in an independent layer, or can be part of a dark layer, a thermally responsive layer, or any other layer of the imaging sheet.

The conductive layer can be formed by thick film printing, sputter coating, or other printing or coating means. The conductive layer can be any suitable material, for example, a metal; a conductive metal oxide, for example tin oxide or indium tin oxide; a conductive polymer such as polythiophene; an aqueous conductive material such as carbon, graphite, or silver, exemplified by Electrodag 423SS screen printable electrical conductive material from Acheson Corporation; or an organic conductor such as poly(3,4-ethylenedioxythiophene) poly(styrene sulfonated, known as PEDT/PSS or PEDOT/PSS polymer, sold as Baytron® P by Bayer AG Electronic Chemicals. The conductive material can be opaque or transparent. According to certain embodiments, at least one layer of conductive material is transparent.

When two conductive layers are present, an electric field can be applied to the bistable material. Alternately, when one conductive layer is present, a second conductive material can be placed on the imaging sheet on the side of the bistable material opposite the conductive layer of the imaging sheet, and an electric field applied to the bistable material. The application of an electric field can be used to help write the bistable material during imaging of an object by lowering the amount of thermal energy needed to image the object. The application of an electric field can be used to erase an image from the bistable material. Also, the application of an electric field can be used to write specific information to the imaging sheet, for example, an identification number, tracking information, name, or other information pertinent to the imaged object, before or after imaging the object. Methods of writing bistable material are known in the art, for example, as described in detail in co-filed applications by Xiang-Dong Mi and Stanley Stephenson, U.S. patent application Ser. Nos. 07/470,459 and 08/974,278, and U.S. Pat. No. 5,437,811 to Doane et al.

Once formed, the imaging sheet can be used by itself, or attached to a carrier. Attachment to a carrier can occur before or after imaging. The carrier can be any material, for example, natural or synthetic paper, cardboard, plastic, or cloth. The carrier can be a rigid material to improve handling of the imaging sheet, which can be flexible. The carrier can be one or more layers. The imaging sheet can be attached to one side of the carrier, or can be incorporated into the carrier, for example, by insertion between one or more layers of the carrier. The attachment can be by any means, including physical retainers such as clips, pins, staples, tacks or the like, and adhesives, including wet adhesives, hot melt adhesives, two-part adhesives, thermo-curing adhesives, light cured adhesives, conductive adhesives, or the like. The carrier can include one or more opening to expose the imaging sheet to an energy source, such as a light. The carrier can include a protective cover, such as a flap, that can be moved over the imaging sheet to protect it when not imaging.

An image can be formed on the imaging sheet by applying energy to the sheet so as to raise the temperature of the bistable thermally responsive material above a threshold level, wherein the areas of the bistable thermally responsive material to which heat has been applied change state, so as to be visually distinguishable from the areas to which heat has not been applied, and retain a changed state on cooling. The energy can be applied in the form of light, heat, electric field, magnetic field, or a combination thereof. The energy can be applied before the object is touched to the imaging sheet, simultaneous therewith, or after the object is applied to the sheet but while it is still in contact therewith. Optionally, the object can be heated before application of the object to the imaging sheet. The heat of the object alone, or in combination with application of another energy source to the imaging sheet, can raise the bistable thermally responsive material above the threshold level needed to form the bistable image. Suitable energy sources include a thermal heater, thermal printhead, laser, light source, infrared light source, ultraviolet light source, flashlamp, xenon flashlamp, magnetic field generator, or electricity applied to conductors on either side of the bistable material.

The area of the object that is in contact with the imaging sheet is believed to act as a heat sink, removing heat from the imaging sheet such that the imaging sheet does not reach the threshold temperature in those areas. The areas of the imaging sheet not touching the object, such as where the object ends or where the object has indentations, retains the heat generated from the applied energy, and crosses the threshold temperature level to change state, thereby changing appearance.

The threshold level of the bistable material is dependent on the type and thickness of the bistable material, and can be effected by the material of adjacent layers, for example, a thermo-converting layer, and the type of energy applied. Sufficient energy can be applied to form a reversible image, or a permanent image.

If the image is not permanently formed, it can be erased from the imaging sheet, which can then be used to form another image. To erase bistable thermo-setting material, the material can be exposed to heat above the threshold level for a sufficient period of time to cause the entire imaging sheet to turn a uniform color, the imaging sheet can be exposed to a sufficiently strong magnetic or electric field to cause a uniform coloration of the sheet, or a combination of heat and electric or magnetic field can be applied.

Whether forming the image or erasing the image, using a combination of energy types together allows each energy type applied, for example, heat, electric current, magnetic field, or light, to be of less intensity than if that were the only energy source. The combination of energy types, allowing less thermal energy to be used, also reduces thermal stress on the imaging sheet.

As described herein, an imaging sheet can be used to form an image of an object by applying the object against the imaging sheet, and applying energy to the sheet to raise a bistable thermally responsive material therein above a threshold level, thereby forming an image of the object. The imaging sheet can be used to make images of objects, including, for example, a fingerprint, a thumbprint, a handprint, a footprint, a watermark, a seal, an insignia, or artwork. The object can be three-dimensional. Depending on orientation of layers in the imaging sheet, the image formed can be a mirror image or true image of the object. If the imaging sheet is viewable from both sides, both images can be seen.

It is desirable that any crevices or indentations on the object be at least as wide as the bistable material layer is thick. According to certain embodiments, the width of any area on the object between areas contacting the imaging layer can be at least twice the thickness of the bistable imaging material, for example, at least four times, at least six time, or at least ten times the thickness of the bistable material layer. Dependent on the location in the imaging sheet, the layer containing a thermo-converting material can be thinner than the bistable material layer, for example, when the thermo-converting material is between the energy source and the bistable material layer, or the thermo-converting material layer can be at least as thick as the bistable material layer, for example, when it is on a side of the bistable material layer opposite the energy source.

Ordinary energy sources can be used for imaging, for example, known heating apparatuses, such as ovens, stoves, open flames, or microwaves; and light sources such as light bulbs, white lights, ultraviolet lights, or infrared lights, eliminating the need to transport heavy, delicate, or cumbersome imaging systems. Only the imaging sheet needs to be transported to a place where an image is to be formed, so long as some energy source is available for use with the imaging sheet, the object, or both.

The invention can be exemplified by a method of forming a fingerprint on an imaging sheet, as shown in the accompanying figures and described below.

Figure 1:
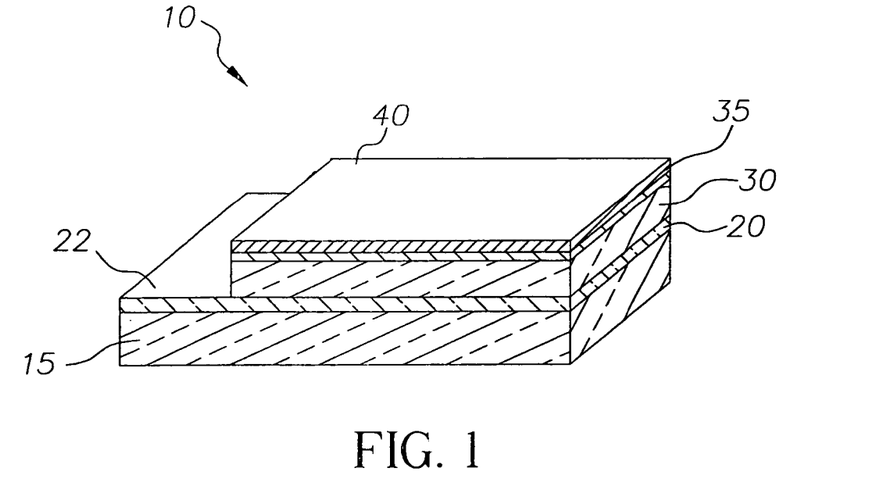
FIG. 1 is a partial cross-sectional view of an imaging sheet in accordance with the present invention.

FIG. 1 is a partial cross sectional view of an imaging sheet 10 including a substrate 15, which can be a thin transparent polymeric material, such as Kodak Estar® film base formed of polyester plastic that has a thickness of between 20 and 200 micrometers. In an exemplary embodiment, substrate 15 can be a 125-micrometer thick sheet of polyester film base. A conductor 20 can be formed on substrate 15. The first conductor 20 can be tin-oxide, indium-tin-oxide (ITO), or an organic conductor, and can be transparent. The material forming the first conductor 20 can be sputtered or coated as a layer over substrate 15.

A bistable material layer 30, such as a cholesteric layer, can be coated on first transparent conductor 20, when present, or directly on substrate 15. Cholesteric layer 30 can be a cholesteric liquid-crystal material, such as those disclosed in U.S. Pat. No. 5,695,682 to Doane et al. For example, cholesteric layer 30 can be cholesteric material BL-118 from E.M. Industries, dispersed in a suitable binder material, such as deionized photographic gelatin, polyvinyl alcohol (PVA), or polyethylene oxide (PEO), to form an emulsion having 8–10 micron diameter domains of the liquid crystal. Liquid crystal domains can be formed using the limited coalescence technique described, for example, in U.S. Pat. No. 6,423,368 to Stephenson et al. The bistable material can be coated on the substrate 15 or over the first conductor 20 and dried to provide a polymer dispersed cholesteric coating with a desirable thickness, for example, about 9 microns thick. The bistable material can be machine coated using coating equipment of the type employed in the manufacture of photographic films. When present, portions of first transparent conductor 20 can be left uncoated to provide exposed first conductors 22, or bistable material can be removed from the conductor 20 after coating to create exposed first conductors 22.

A dark layer 35 can be formed on a side of the bistable material layer 30 opposite the substrate 15. The dark layer 35 can include a light-absorbing dye that operates on a portion of the light passing through dark layer 35. Particular wavelengths of light can be absorbed by the dark layer 35, and the remaining light can pass through the dark layer 35. The dark layer 35 can be coated simultaneous with the deposition of cholesteric layer 30, or as a separate step. In a preferred embodiment, multi-layer coating equipment of the kind used in the photographic industry provides cholesteric layer 30 and dark layer 35 as two co-deposited layers. Dark layer 35 can have a minimal effect on the electrical field strength required to change the state of the cholesteric liquid-crystal material. Dark layer 35 can comprise carbon pigment which absorbs UV, visible and infrared wavelengths of light. Dark layer 35 can have an optical density of 2.0 or greater.

A second conductive layer 40 can be formed on the dark layer 35 on a side opposite the bistable material layer 30. Second conductor 40 can have sufficient conductivity to operate in conjunction with first conductor 20 to induce an electric field across cholesteric layer 30, wherein the electric field is strong enough to change the optical state of the cholesteric material. Second conductor 40 can be formed of a reflective metal, for example, by vacuum deposition of a conductive, reflective material such as aluminum, chrome or nickel. In the case of vacuum-coated second conductor 40, aluminum or silver can provide very high reflectance and conductivity. The layer of conductive material can be patterned using well-known techniques such as photolithography, laser etching or by application through a mask. Second conductor 40 can be formed by screen printing a reflective, conductive formulation such as UVAG® 0010 from Allied Photochemical of Kimball, Mich., which includes finely divided silver in an ultraviolet-curable resin. Second conductor 40 can be formed by screen printing a thermally cured silver-bearing resin, such as Electrodag® 461SS from Acheson Corporation, a heat cured silver ink. Second conductor 40 can be formed by screen-printing conductive ink such as Electrodag 423SS screen printable electrical conductive material from Acheson Corporation that includes finely divided graphite particles in a thermoplastic resin. When the dark layer 35 is black, any type of conductor can be used, including black carbon in a binder. The dark layer 35 can be the same as second conductor 40.

Figure 2:
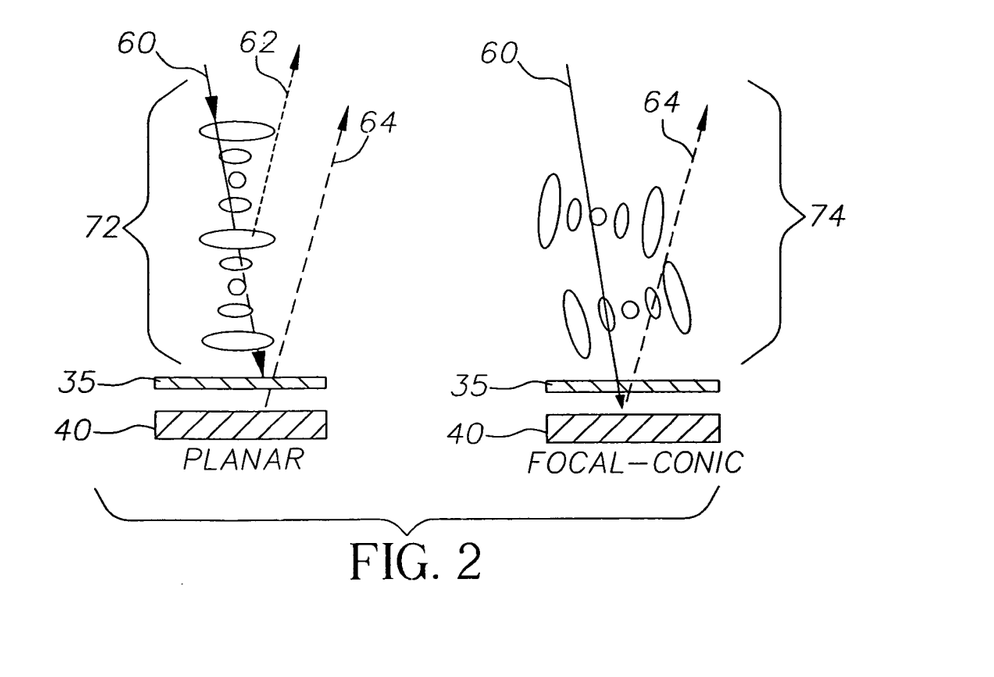
FIG. 2 is a schematic view of a chiral nematic liquid crystal material in a planar state and a focal-conic state responding to incident light.

FIG. 2 is a schematic section view of optical states of cholesteric liquid crystal. The left diagram demonstrates the optical path when the cholesteric material is in a planar state. Incident light 60 from the substrate 15 side of the imaging sheet strikes planar liquid crystal 72, which reflects a portion of incident light 60 as reflected light 62. The remaining light passes through a dark layer 35 to second conductor 40, where the light can be reflected from second conductor 40 to pass through dark layer 35 a second time, and then pass through planar material 72 to become complementary light 64. Complementary light 64 operating in conjunction with a cholesteric liquid crystal having a peak reflectance near 575 nanometers forms a substantially color-neutral reflective surface.

On the right side of FIG. 2, the liquid-crystal material is in a focal-conic state 74 and transmits incident light 60. Dark layer 35 provides complementary light 64 when the liquid crystal material is in a focal conic state. As one alternative, dark layer 35 can be a thin, black layer that absorbs across all wavelengths of light. Such layers can be formed from solutions of carbon black in a polymeric binder, such as gelatin. With a black dark layer 35, when the cholesteric material is in the focal-conic state, the corresponding image will be essentially black.

It has been determined that imaging of the bistable layer 30 occurs due to thermal energy raising the temperature of the bistable material in selected areas. A pulse of radiation energy ($\lambda$) of correct power and duration can provide a patterned thermal flux sufficient to write the cholesteric material into a pattern of planar and focal-conic areas, forming an image.

As coated, an imaging sheet 10 has cholesteric liquid crystal in the planar state. Experiments heating imaging sheet 10 to raise the temperature of the cholesteric material above the threshold level determined that if the heated sheets were cooled slowly, cholesteric layer 30 would assume a focal-conic state. If the imaging sheet 10 comes in contact with an object in the heated state, rapid cooling of the touched area can convert the cholesteric layer 30 to the planar state. For example, pressing a finger against a heated imaging sheet 10 can form an image of a fingerprint in the cholesteric layer 30, thereby recording an image of the finger, wherein the contacted areas of the imaging sheet are in the planar state, and the non-contacted areas are in the focal-conic state.

To form a fingerprint, a Sunpak auto 383 super xenon flash unit was positioned on the substrate side of imaging sheet 10 to provide a pulse of radiation energy ($\lambda$) though the substrate 15 of imaging sheet 10. The output of the flash unit was adjusted so that an energy pulse would be sufficient to heat cholesteric layer 30 to the threshold level of the cholesteric liquid crystal 30. A finger was pressed against second conductor 40 and the thermal pulse was applied using the xenon flash unit. An image of the fingerprint was recorded on imaging sheet 10 by the application of power from the flash unit. An imaging sheet 10 was written into the focal-conic state and the experiment was repeated. The resulting image had less contrast, but was visible.

Figure 3:
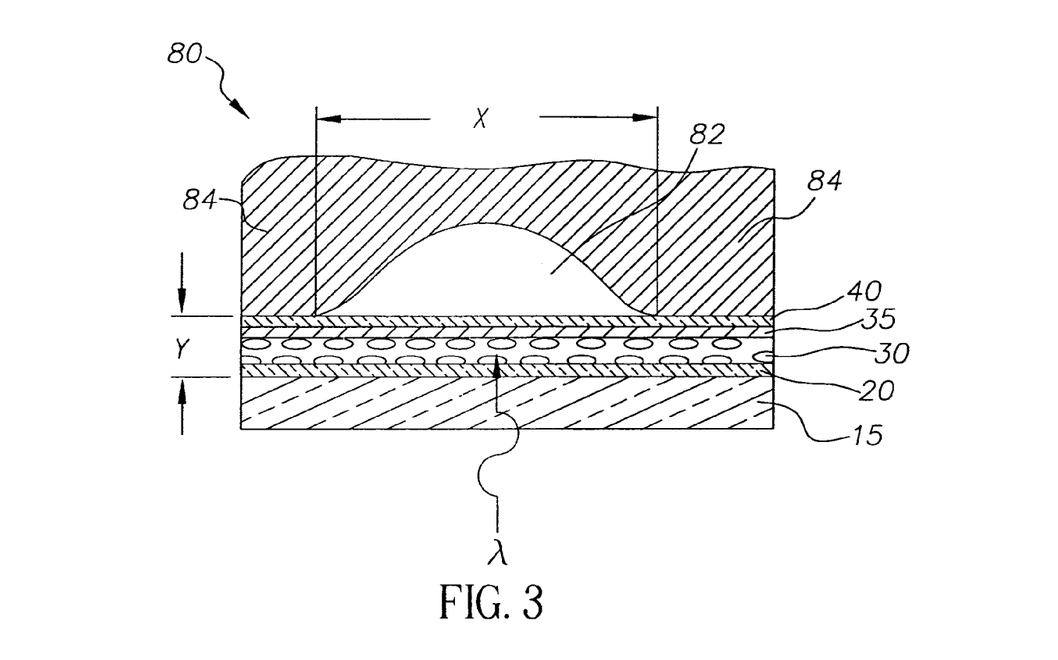
FIG. 3 is a partial cross-sectional view of an object in contact with an imaging sheet.

FIG. 3 is a magnified side section view of a human finger in contact with an imaging sheet 10 in accordance with an example of the present invention. In the exemplified embodiment, the combined thickness of cholesteric layer 30 and dark layer 35 was less than 12 microns. All layers coated on the substrate, including first conductor 20 and second conductor 40, corresponding to distance Y in FIG. 3, were a combined thickness of less than 15 microns. Finger 80 had a pattern of ridges 84 and furrows 82 that uniquely identified an individual. The width of a furrow 82, distance X, was greater than the thickness Y of the imaging layers of imaging sheet 10. When the finger 80 was placed in contact with imaging sheet 10 and then imaged by a xenon flash, areas of imaging sheet 10 in contact with ridges 84 were not heated to the threshold level of bistable material layer 30, and remained bright (planar state), while areas corresponding to furrows 82 did achieve the threshold level and turned black, corresponding to the focal-conic state. As shown by this experiment, high resolution images of fingerprints can be recorded using imaging sheet 10 with little discomfort to the person whose finger is being imaged. After formation of the fingerprint, a 120-volt, 1 kilohertz, 50 cycle pulse was applied through first and second conductors 20, 40, erasing the image and returning cholesteric layer 30 to the planar state, where it was capable of being imaged again.

The operative elements of the imaging process are cholesteric layer 30 and dark layer 40, which included a thermo-converting material. The thermo-converting material in dark layer 40 concentrated a small amount of thermal energy locally on the cholesteric layer 30. The temperature rise in the local area was controlled by the presence or absence of a human finger on the imaging element. The entire sheet can be heated and the fingerprint recorded by pressing the finger against the imaging sheet 10 on a side opposite the substrate 15. Heating the entire sheet can require significant energy and time, whereas the use of a flash unit allowed instant capture of the image, and can reduce the energy applied to the skin surface.

To create high contrast reflective images, it is desirable to include a dark contrast surface, such as dark layer 35, on the cholesteric layer 30. In an experiment, the imaging sheet 10 was reversed so that finger 80 was pressed against 125 micron thick substrate 15, and a xenon flash was applied from the opposite side of the imaging sheet 10. A fingerprint was formed, but was not clear, demonstrating that contact with the imaging sheet 10 must occur closer to the cholesteric material, thermo-converting layer, or both, to achieve high image resolution. A thin substrate 15 could allow imaging of the finger to occur from the substrate side. The distance between an object to be imaged and the bistable material layer and/or the thermo-converting material layer is a function of the bistable material, the thickness of the various layers in the imaging sheet, the type and quantity of energy applied, and the material of the object to be imaged.

The use of first transparent conductors 20 and second conductors 40 in imaging sheet 10 allow the imaging sheet 10 to be driven into the planar state with an electrical pulse. This can be used to initialize the imaging sheet 10 into a planar state before imaging, or to reset cholesteric layer 35 into the planar state in case of image capture error, erasing any formed image. However, the imaging process is not dependent on the presence of conductors in or on the imaging sheet 10. The imaging sheet 10 can be thermally pulsed in the absence of first conductor 20 and second conductor 40 to imprint a fingerprint image on imaging sheet 10, or the finger could be heated and applied to the imaging sheet 10.

Figure 4:
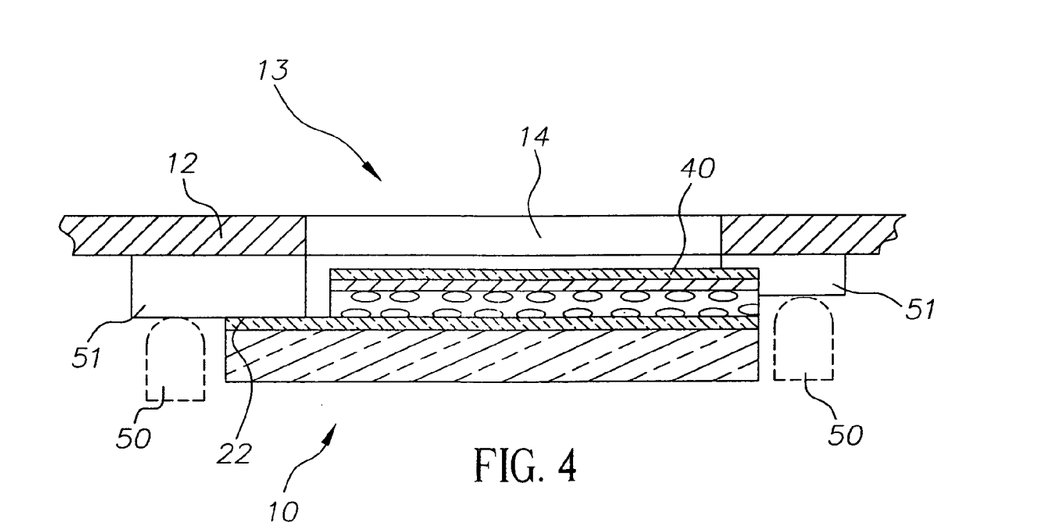
FIG. 4 is a side view of an imaging sheet in accordance with the present invention.

FIG. 4 is a side section view of an imaging sheet 10 attached to a carrier or support 12. Support 12 can be a sheet of paper that can contain preprinted information or receive printed information through handwriting, printing, or other means. Imaging sheet 10 can be attached to one side of support 12 over an opening 40 in support 12 by adhesive 51 to create an imaging assembly 13. Adhesive 51 can be conductive to function as both a bonding agent and as a contact to exposed first conductor 22 of imaging sheet 10 and second conductor 40. Electrodes 50 can be applied to conductive adhesive 51 to provide an electrical field across cholesteric layer 30 for initializing or resetting the optical state of cholesteric layer 30.

Figure 5:
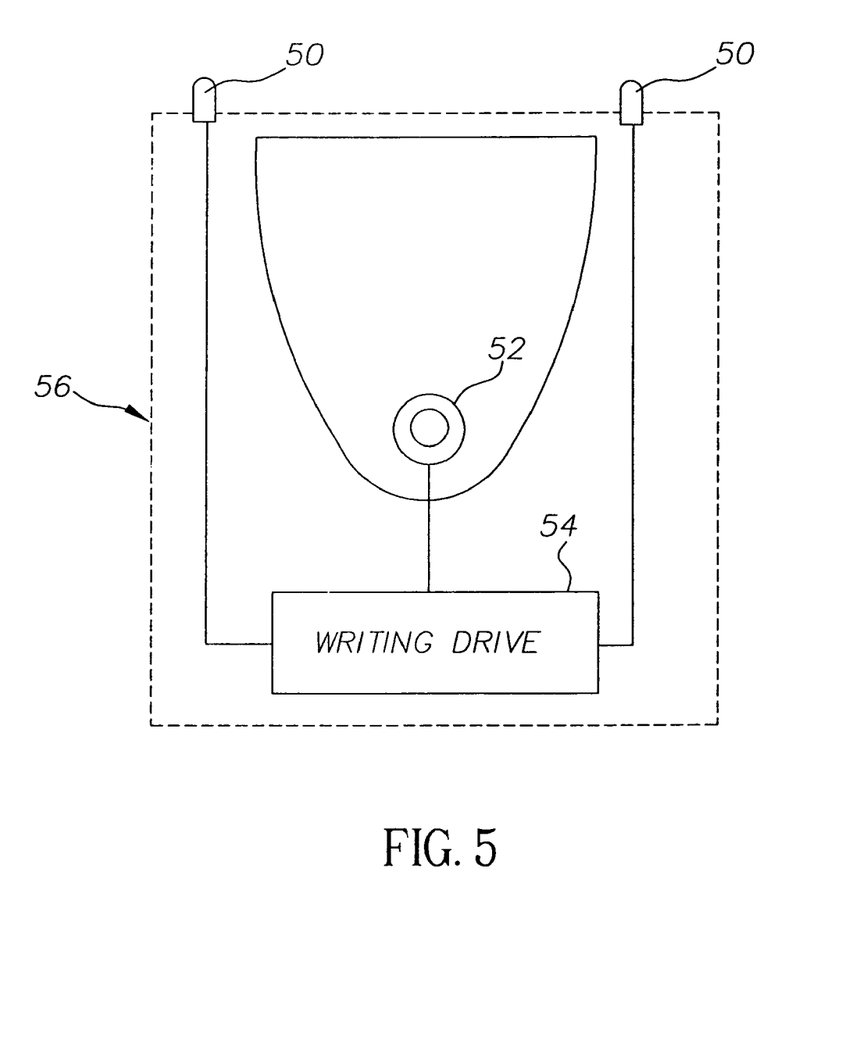
FIG. 5 is a schematic view of an imaging device.

FIG. 5 is a schematic view of an imaging element in accordance with the present invention. Imaging element 56 contains electrodes 50 and a heat source 52. Heat source 52 can be a conventional xenon flash which provides a pulse of light to imaging sheet 10. Imaging drive 54 contains power and control mechanisms to activate heat source 52 and electrodes 50.

Figure 6:
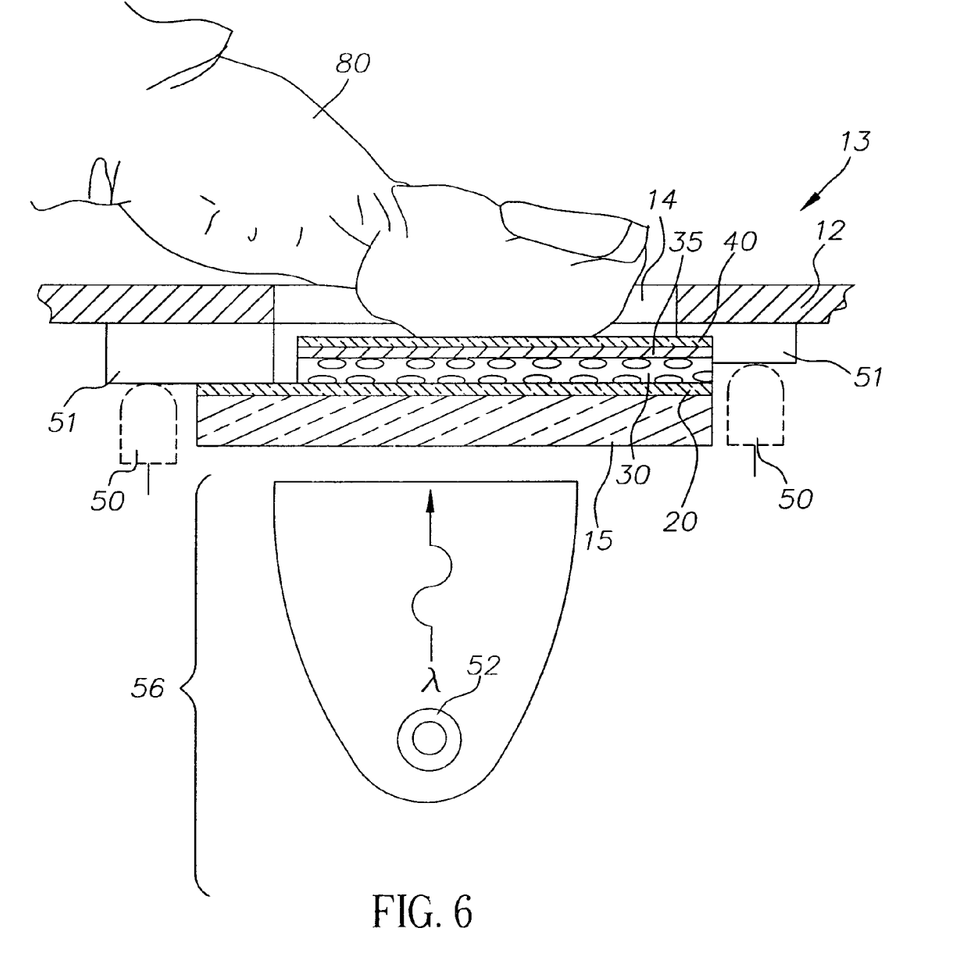
FIG. 6 is side view of the capture of a fingerprint.

FIG. 6 is a side view of the capture of a fingerprint in accordance with the present invention. Imaging assembly 13 has been brought into alignment with imaging element 56. Contacts 50 can engage conductive adhesive 51 to provide an electrical field between first conductor 20 and second conductor 40 across cholesteric layer 30. For example, contacts 50 can provide a pulse of electrical energy to cholesteric layer 30 to drive all areas of cholesteric layer 30 into an initial planar state. Finger 80 can be pressed against imaging sheet 10 to contact second conductor 40 through support opening 14. Heat source 52 can supply a xenon flash to apply a pulse of radiation energy ($\lambda$) to imaging sheet 10 through substrate 15. Dark layer 35, including a thermo-converting material, can absorb the pulse of radiation energy ($\lambda$), convert it to heat, and heat cholesteric layer 30. Contact by finger 80 with imaging sheet 10 can create a heat pattern in cholesteric layer 30 of imaging sheet 10 during the pulse of radiation energy ($\lambda$). The pattern of heat creates a pattern of planar and focal-conic states in the liquid crystal layer 30 corresponding to the ridges and furrows, respectively, of the finger 80.

Figure 7:
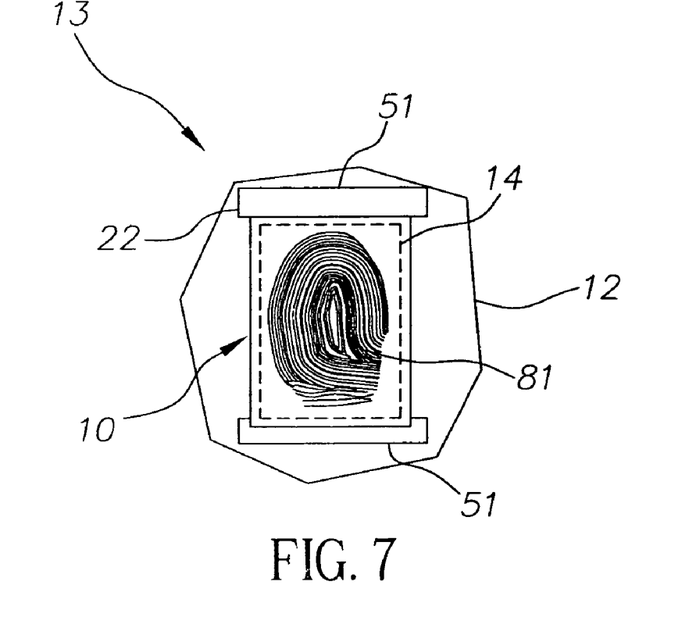
FIG. 7 is a bottom view of the imaged sheet of FIG. 6.

FIG. 7 is a view of the imaging assembly 13 of FIG. 6 after imaging, from the imaging sheet 10 substrate 15 side, showing the image of the finger 81. It is noted that the image 81 corresponds to the finger when viewed from the substrate 15 side of the imaging sheet 10, not a fingerprint of the finger, which would be a mirror image.

Figure 8:
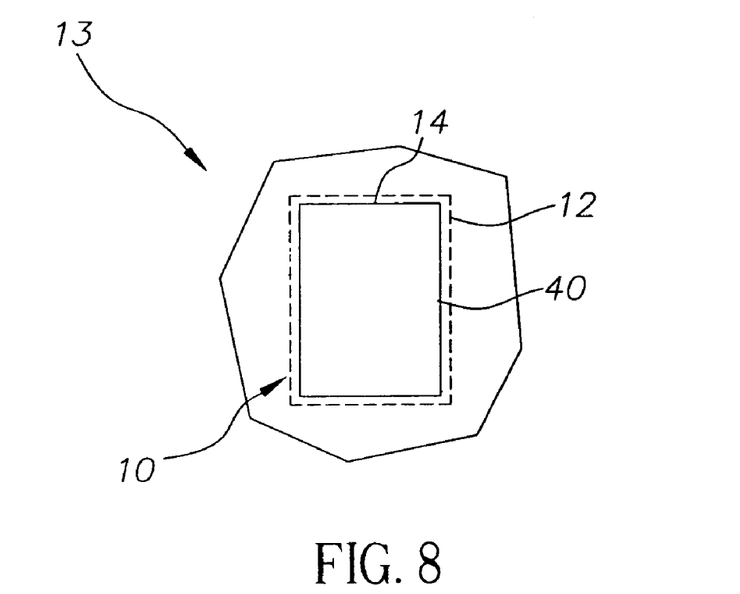
FIG. 8 is a top view of the imaging sheet of FIG. 6.

FIG. 8 is a view of the imaging assembly of FIG. 6 from the side of the second conductor 40. Support opening 14 exposes second conductor 40 to receive contact with a finger. Radiation passes from the substrate side of the imaging sheet 10 though support opening 14 to a finger or other object on second conductor 40. Here, second conductor 40 is opaque.

Figure 9:
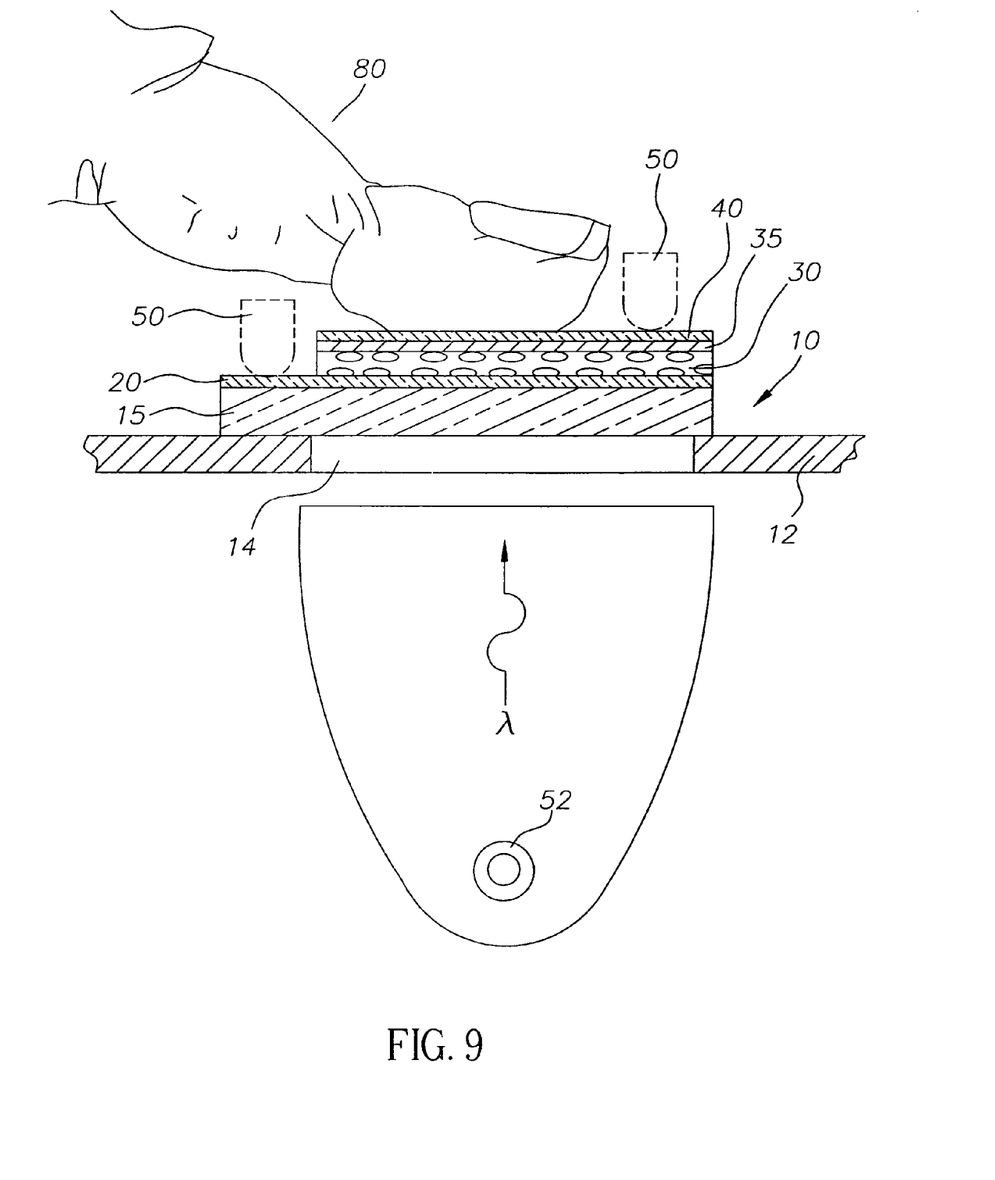
FIG. 9 is side view of the capture of a fingerprint according to a second embodiment of the invention.

FIG. 9 is side view of the capture of a fingerprint in accordance with a second embodiment of the present invention. Imaging sheet 10 is bonded to the opposite side of support 12, such that support opening 14 permits radiation from heat source 52 to irradiate imaging sheet 10 through substrate 15. The formed image can be viewed through support opening 14 of support 12, and again corresponds to the actual finger, not the fingerprint.

Figure 10:
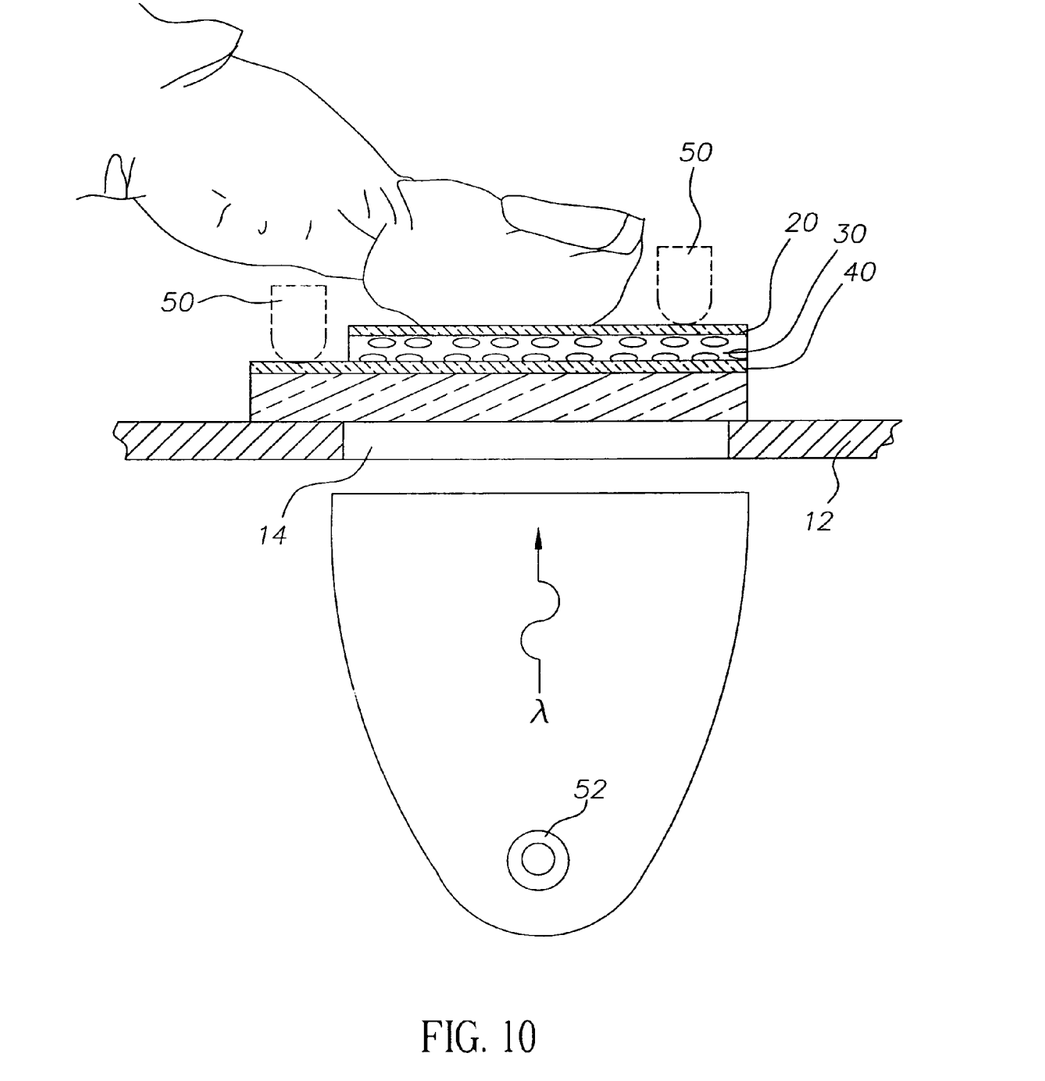
FIG. 10 is side view of the capture of a fingerprint according to a third embodiment of the invention.

FIG. 10 is side view of the capture of a fingerprint in accordance with a third embodiment of the present invention. Imaging sheet 10 has a dark layer including a thermo-converting material formed on substrate 15. The dark layer acts as second conductor 40. Cholesteric layer 30 can be formed over second conductor 40. A first transparent conductor 20 can be coated over cholesteric layer 30 to cooperate with second conductor 40. A finger 80 can be pressed against transparent second conductor 20 or, in the absence of first and second conductors, directly against cholesteric layer 30. As shown, imaging sheet 10 can be attached directly to the front of support 12, or can be attached to the back side of the support, so the finger would be placed on the imaging sheet through support opening 14. Energy in the form of light can be passed from heat source 52 to the imaging sheet 10 through support opening 14, forming an image of the finger. In this instance, because the imaging sheet 10 is viewed from the side to which the object was applied, the mirror image of the object is observed, in this instance, the fingerprint.

The invention has been described in detail with particular reference to certain preferred embodiments thereof, but it will be understood that variations and modifications can be effected within the spirit and scope of the invention.

PARTS LIST

10 imaging sheet
12 support
13 imaging assembly
14 support opening
15 substrate
20 first conductor
22 exposed first conductor
30 cholesteric layer
35 dark layer
40 second conductor
50 electrodes
51 conductive adhesive
52 heat source
54 imaging drive
56 imaging element
60 incident light
62 reflected light
64 complementary light
72 planar liquid crystal
74 focal-conic liquid crystal
80 finger
81 fingerprint
82 furrow
84 ridge

What is claimed is:

1. A contact imaging method comprising:
    obtaining an imaging sheet, the imaging sheet comprising a substrate and a bistable thermally responsive material layer on the substrate;
    obtaining an object to be imaged;
    applying energy to heat the imaging sheet, the object, or both; and
    contacting the object with the imaging sheet.

2. The method of claim 1, wherein the energy is heat.

3. The method of claim 1, wherein the energy is applied to the imaging sheet, and the imaging sheet further comprises a thermo-converting material to convert the energy to heat.

4. The method of claim 3, wherein the energy is a flash lamp, a thermal heat source, an infrared light source, an ultraviolet light source, or a combination thereof.

5. The method of claim 1, wherein the energy is applied to the object, and the energy is heat.

6. The method of claim 1, wherein applying the energy comprises aligning the imaging sheet with an imaging element comprising an energy source, and activating the imaging element to emit energy from the energy source towards the imaging sheet or the object.

7. The method of claim 1, comprising applying energy to heat the imaging sheet, and contacting the object with the imaging sheet.

8. The method of claim 1, comprising contacting the object with the imaging sheet, and applying energy to heat the imaging sheet.

9. The method of claim 1, comprising contacting the object with the imaging sheet while applying energy to heat the imaging sheet.

10. The method of claim 1, comprising applying energy to heat the object, and contacting the object with the imaging sheet.

11. The method of claim 1, wherein energy is applied to both the object and the imaging sheet.

12. The method of claim 1, wherein the imaging sheet further comprises a first conductor between the substrate and the thermally responsive bistable material, and a second conductor on a side of the thermally responsive material opposite the substrate.

13. The method of claim 12, wherein the energy source applied to the imaging sheet is a flash lamp, a thermal heat source, an infrared light source, an ultraviolet light source, an electrical pulse, or a combination thereof.

14. The method of claim 1, wherein the bistable thermally responsive material is a liquid crystal material.

15. The method of claim 1, wherein the object to be imaged comprises a finger, a thumb, a hand, a foot, a watermark, a seal, an insignia, or artwork.

16. A contact imaging system for forming a contact image of an object, comprising:
    an imaging sheet, wherein the imaging sheet comprises a substrate and a bistable thermally responsive material layer on the substrate; and
    an imaging element comprising a heat source.

17. The system of claim 16, wherein the bistable thermally responsive material is a liquid crystal material.

18. A contact imaging system for forming a contact image of an object, comprising:
    an imaging sheet, wherein the imaging sheet comprises a substrate, a bistable thermally responsive material layer on the substrate, and a thermo-converting material that generates heat from energy emitted by an energy source; and
    an imaging element comprising the energy source.

19. The system of claim 18, wherein the energy source is a flash lamp, a thermal heat source, an infrared light source, an ultraviolet light source, or a combination thereof.

20. The system of claim 18, wherein the bistable thermally responsive material is a liquid crystal material.

* * * * *